Jan. 27, 1959   E. F. ASTON   2,870,838
CUTTING TOOL FOR A TREPAN CORE
Filed June 10, 1958
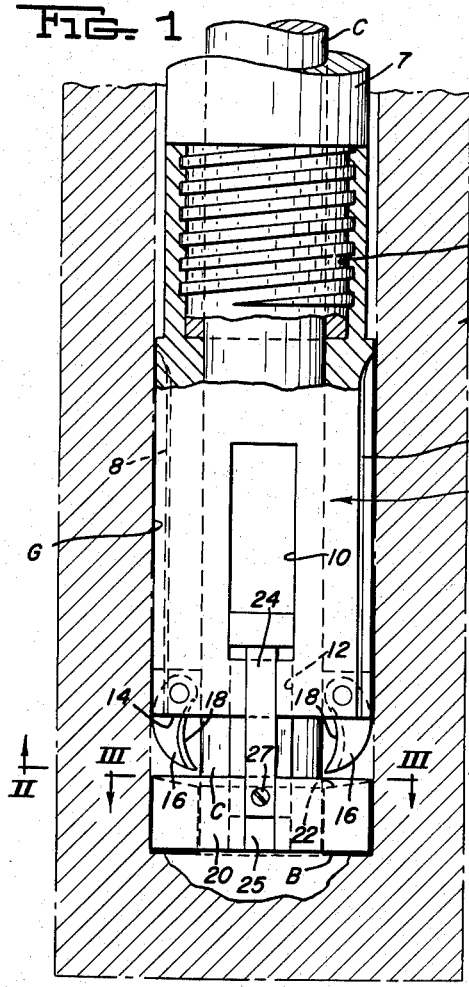
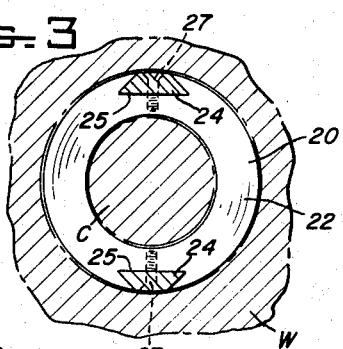
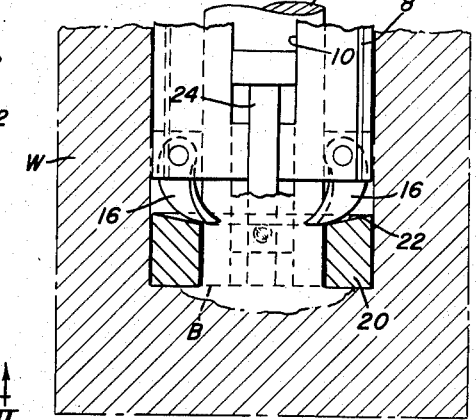
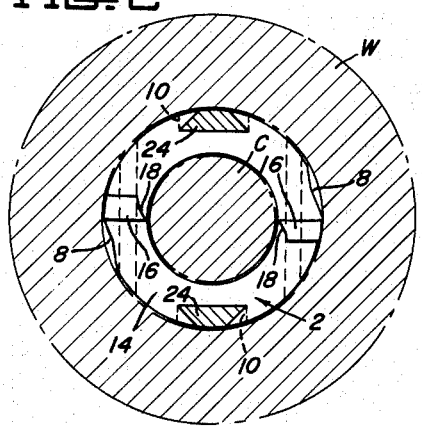
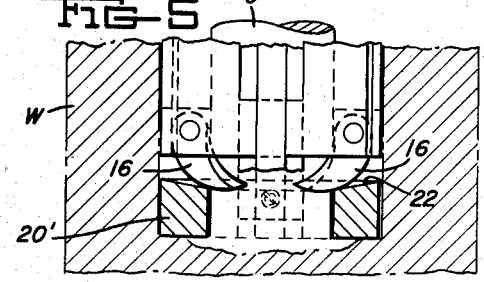
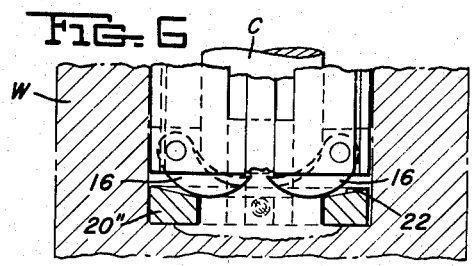
INVENTOR
EARL F. ASTON
By Donald G. Dalton
Attorney

United States Patent Office 2,870,838
Patented Jan. 27, 1959

2,870,838

CUTTING TOOL FOR A TREPAN CORE

Earl F. Aston, Homestead Park, Pa., assignor to United States Steel Corporation, a corporation of New Jersey Application June 10, 1958, Serial No. 741,040

1 Claim. (Cl. 164—60)

The present invention relates generally to metal cutting tools and more particularly to a metal cutting tool especially suitable for cutting a trepan core from the blank end of a hole.

Prior to my invention, in the machining of metals, drilling holes in metal workpieces was an operation that required considerable time particularly when it was necessary to drill holes of extended length in hardened or high carbon steel. Recently, trepanning with single tool carbide cutters has speeded up such drilling operations considerably. For example, to drill a 3 inch axial hole 147 inches long in a forged steel rolling mill roll required 14 hours using conventional drilling methods where the hole was made by removing all of the metal from the hole chip by chip with a conventional cutter. With the use of a single tool carbide trepan cutter, however, the same size hole can be trepanned in 55 minutes. In trepanning, a hollow drill cutter is used to cut a narrow annular kerf around the outer perimeter of the hole leaving a solid trepan core.

Although trepanning is a very successful method of drilling when it is desired to drill a hole completely through a workpiece, this method cannot be used to drill a hole that is to extend only partially through a workpiece. In drilling completely through a workpiece by the trepan method the trepan core is cut completely away from the main body of the workpiece as the trepan cutter progresses through the workpiece. However, prior to my invention, it was not possible to use the trepan method to drill a hole which would not extend completely through the workpiece since there was no way to remove the trepan core from the blank end of the hole after the trepanning had been completed.

It is accordingly an object of the invention to provide a trepan core cutting tool for cutting the trepan core at the blank end of a hole so as to facilitate removal of the core.

It is another object of the invention to provide a trepan core cutting tool which can be used to cut away a trepan core from the blank end of a trepanned drilled hole regardless of length of the core.

A further object of the invention is to provide a trepan cutting tool for removing a trepan core from the blank end of a hole as a solid piece suitable for metallurgical test purposes.

These and other objects will become more apparent after referring to the following specification and attached drawings in which:

Figure 1 is an elevational view of the tool of the invention in operative position in a workpiece shown in section;

Figure 2 is a cross-sectional view taken on the line II—II of Figure 1;

Figure 3 is a cross-sectional view taken on the line III—III of Figure 1;

Figure 4 is an elevational view partly in section showing the tool of the invention in one phase of its operating cycle;

Figure 5 is a view similar to Figure 4 showing the tool of the invention provided with a modified bearing ring in another phase of its operating cycle; and Figure 6 is a view similar to Figure 5 showing the tool of the invention provided with a modified bearing ring in still another phase of its operating cycle.

Reference numeral 2 designates the main body portion of the tool of the invention. Body 2 is cylindrical in shape and has an axial opening extending therethrough. The rearward end of the body 2 is internally threaded as at 6 for receiving a hollow rod or tool handle 7. Two lengthwise external flutes 8 extend along substantially the entire length of the body 2 and function to retain chips of metal during the cutting operation of the tool. A pair of opposed recesses 10 are formed on the exterior of the body 2 each having a dovetail slot 12 at one end communicating with the forward end 14 of the body 2. A pair of semi-crescent shaped cutters 16 are pivotally mounted in suitable recesses in the forward end of the body 2. The semi-crescent shaped cutters extend forwardly of the body 2 and have their cutting edges 18 on their concave sides.

A bearing ring 20 having a slightly concave bearing surface 22 is slidably attached to the body 2 spaced forwardly thereof by means of a pair of arms 24. The arms 24 have a dovetail shape cross section conforming to the dovetail slots 12 whereby they are retained within the slots for sliding movement axially in the recesses 10. The arms 24 are received in slots 25 in the ring 20 and are retained therein by means of screws 27. Slots 25 are similar in cross-section to the dovetail slots 12 in the main body portion of the tool.

In Figure 1, reference character W designates a workpiece which has been trepanned. As a result of the trepanning operation a trepan core C remains attached to the blank end B of the drilled hole. An annular kerf G formed by the trepan tool surrounds the core C.

In operation, the rod or tool handle 7 is affixed to the tool body 2 and the tool with attached ring is advanced along the core until the bottom of the ring 20 abuts the blank end of the kerf G. Then, as the workpiece W is rotated the tool is carefully hand fed forwardly so that the cutters 16 are progressively pivoted inwardly by the bearing ring 20. As the cutters pivot inwardly they cut a groove in the periphery of the rotating core C. In practice it has been found preferable to cut the core in stages rather than in one operation since this eliminates the danger of the cutters 16 binding in the core and breaking.

After the tool has been advanced to a point where the cutters 16 start to bind on the sides of grooves they have cut the operation is interrupted and tool including the attached ring is removed from the workpiece. After withdrawal, the ring 20 is removed from the tool and a thinner ring 20' is substituted therefor and the cutting operation is repeated. Due to the difference in the bearing ring thicknesses, after the ring 20' has been affixed to the tool the cutters 16 cut a groove in the core C at a point closer to the blank end of the kerf G and thus groove the core ahead of and below the groove cut while ring 20 was attached to the tool. Eventually, the two grooves cut in the core merge with each other thereby making it possible to cut deeper toward the center of the core before the cutters again bind on the sides of the grooves they have cut. If necessary, the cutting tool is again withdrawn from the hole and a thinner bearing ring 20" is substituted for ring 20' and the same operation is repeated. Each time the tool is withdrawn the flutes 8 which hold the chips formed during the cutting operation are cleaned out. The bearing ring 20" permits a new groove to be cut in the core closer to the blank end of the kerf G and the cutters enlarge the groove beyond where the three cuts merge into one and to such an extent that the core is almost severed. If desired, the operation may be terminated at this point since, in most cases, the core may be parted from the blank end of the hole by twisting it slightly. In order to facilitate twisting and removal of the core C the outer end thereof may be drilled and tapped (not shown) so that a tool handle (not shown) can be attached thereto. The small portion of the core remaining on the blank end of the hole can be easily removed by conventional cutters such as a flat bottom spade drill.

While one embodiment of my invention has been shown and described, it will be apparent that other adaptations and modifications may be made without departing from the scope of the following claim.

I claim:

A tool for cutting a trepan core comprising a cylindrical body having a bore therethrough dimensioned to admit the core, a semi-crescent shape cutter pivoted on one end of said body and projecting axially therebeyond, a bearing ring coaxial with said body located forwardly of the cutter, said ring having a surface adapted to engage and pivot the cutter, and means connecting the ring to the body for axial movement relative thereto, said means including a pair of opposed arms connected by one end with said bearing ring, said arms each being mounted in a recess on the outer surface of said cylindrical body for axial movement therein relative to said body.

References Cited in the file of this patent

UNITED STATES PATENTS 2,152,341     Baker _____ Mar. 28, 1939

FOREIGN PATENTS 143,972     Germany _____ Sept. 16, 1903